United States Patent [19]

Rao

[11] Patent Number: 5,181,376
[45] Date of Patent: Jan. 26, 1993

[54] PROCESS AND SYSTEM FOR PRODUCING POWER

[75] Inventor: Ashok D. Rao, Mission Viejo, Calif.

[73] Assignee: Fluor Corporation, Irvine, Calif.

[21] Appl. No.: 566,608

[22] Filed: Aug. 10, 1990

[51] Int. Cl.⁵ .................................................. F02G 3/00
[52] U.S. Cl. .............................. 60/39.05; 60/39.182; 60/39.53
[58] Field of Search ............ 60/39.05, 39.182, 39.183, 60/39.181, 39.53, 728

[56] References Cited

U.S. PATENT DOCUMENTS

| | | | |
|---|---|---|---|
| 2,186,706 | 1/1940 | Martinka | 60/39.53 |
| 2,513,601 | 7/1950 | Traupel | 60/39.183 |
| 2,544,941 | 3/1951 | Strub | 60/39.183 |
| 2,654,216 | 10/1953 | Traupel | 60/39.183 |
| 2,793,019 | 5/1957 | Baumann | 60/39.183 |
| 4,406,118 | 9/1983 | Funk | 60/39.183 |
| 4,537,023 | 8/1985 | Nakamura et al. | 60/39.53 |
| 4,829,763 | 5/1989 | Rao | 60/39.53 |

Primary Examiner—Michael Koczo
Assistant Examiner—Michael I. Kocharov
Attorney, Agent, or Firm—Lyon & Lyon

[57] ABSTRACT

An improved combustion-turbine cycle system and process which employs a multi-stage, counter-current flow humidifier to produce moist air for use as combustion air and thermal diluent in a combuster in which the improvement includes utilizing excess fluid produced in the humidifier as a working fluid in a separate, parallel excess fluid turbine and/or as combustion air and thermal diluent for an additional, separate combuster having its own turbine and operating in parallel with the primary combustion turbine machine.

7 Claims, 8 Drawing Sheets

PROCESS AND SYSTEM FOR PRODUCING POWER

BACKGROUND

1. Field of the Invention

This invention relates to an improved combustion turbine cycle which employs a combustion-gas expander and a compressor driven by that expander and in which excess fluid generated by a multi-stage, countercurrent humidifier is used to drive a turbine and/or is used as thermal diluent in a combuster for an additional combustion-gas expander.

2. State of the Art

The simplest form of combustion-turbine cycle includes three necessary components: (a) the combustion-gas expander, (b) a multi-stage compressor which compresses air or an oxygen-containing gas to a predetermined pressure and (c) a combustion chamber where the fuel and the air or other oxygen-containing gas react under pressure to produce a hot, pressurized gas stream which becomes the working fluid. The working fluid in turn energizes the expander. Such a cycle is generally known as a "simple cycle", or "Brayton cycle", and typically has a thermal efficiency of approximately 25% when the hot gas entering this expander is at a temperature of about 1800° F.

The efficiency of any combustion turbine cycle is heavily, although not exclusively, influenced by three factors:

A. Temperature of Working Fluid

The first of the factors is the temperature of the working fluid as it enters the hot-gas expander. It is a well-established thermodynamic principle that the higher the inlet temperature, the higher the potential, or theoretical efficiency of the cycle. Regarding this factor the maximum allowable temperature for gases entering the expander is limited by the metallurgical limits of its working parts and the internal cooling system. The current practice permits maximum temperatures within the range of 2300° F. to 2600° F.

B. Amount of Air Compressed

The second factor is the amount of air that must be compressed. Presently, all known combustion-turbine systems compress more air than is needed for combustion. This excess air is used to cool the flame, and thus act as a thermal diluent. In the absence of a thermal diluent, the flame temperature would be approximately 4000° F., a temperature much too high for the materials of construction used for conventional turbines. As is well understood, the energy used to compress the excess air is a parasitic load on the expander and this load has a major impact on the efficiency of the cycle. For example, in a typical combustion-turbine cycle, one-half to two-thirds of the power produced by the expander is used to drive the air compressor, thus leaving only about one-third to one-half of the power available for useful work. Thus, for every 1% reduction in the compressor load their can be as much as a 2% increase in useful work from the cycle.

C. Extent of Heat Recovery

The third factor is the extent to which heat contained in the hot gas leaving the expander is recovered and employed in the cycle. Many heat-recovery schemes are well-known and several will be described. For example, the so-called "combined cycle", in widespread use today, is an arrangement that improves efficiency by employing a steam cycle in series with the combustion-turbine cycle. The hot exhaust gas from the expander is used to generate high-pressure steam, which in turn drives a steam turbine. A modern combined cycle can have an efficiency of about 50% when the hot gas entering the expander is around 2300° F.

Another scheme in limited use today is the so-called steam-injected cycle. High-pressure steam, either from an external source or from a boiler heated by the hot expander-exhaust gas, is injected into the combustion gases to temper the flame, thus reducing the amount of excess air that must be compressed per unit of fuel combusted. Thermal efficiency for the steam-injected cycle is in the range of 40% to 45% when the steam is produced within the cycle.

An even more efficient cycle, which uses the principle of substituting water vapor for compressed air, is disclosed in U.S. Pat. No. 2,186,706 to Martinka. Other cycles which contain variations of the Martinka '706 cycle are described in U.S. Pat. No. 4,537,023 to Nakamura and in U.S. Pat. No. 4,829,763 to Rao. For example, the Rao '763 cycle uses not only the concept of producing water vapor through use of a multi-stage, countercurrent flow humidifier and, optionally, use of an intercooler and/or aftercooler, it also provides for increased efficiency through deliberate rejection of heat from the cycle by cooling either the circulating water and/or the compressed air. Each of the Martinka '706, Nakamura '023 and Rao '763 cycles are more efficient than the steam-injected cycle because, instead of generating steam at high temperatures of about 400° F. to about 500° F., water is evaporated into the compressed air at temperatures as low as 250° F., thereby permitting greater recovery of heat from the exhaust gases. A cycle combining the concepts disclosed in Martinka '706, Nakamura '023 and Rao '763, as shown schematically in FIG. 1, can have an efficiency of 54% when the hot gas entering the expander is about 2300° F.

Furthermore, unlike the combined cycle, the steam-injected cycle and most other combustion-turbine cycles, the efficiency of the Martinka '706, Nakamura '023 and Rao '763 cycles can be significantly improved by loading the air to the expander with even more water, through the use of low-temperature, so-called waste heat from sources external to the cycle. Such waste heat may be in the temperature range of 350° F. to 250° F., as schematically illustrated in FIG. 2.

Despite the potential advantages of the Martinka '706, Nakamura '023 and Rao '763 cycles none of these cycles are known to have been used commercially because there is no known cost effective, suitable combustion turbine machine available for use with these cycles. The term "machine" when used in this context refers to a compressor and a turbo expander. All known combustion-turbine machines on the market today are closely coupled, direct-drive machines. In such machines, because the pressure at the outlet of the compressor must remain slightly above the pressure of the inlet of the expander, the ratio of the air mass flow rate in the compressor to the fluid mass flow rate in the expander must remain within narrow limits set by the original machine design. However, when a significant amount of water vapor is substituted for part of the air as the working fluid in the expander, the ratio of air mass flow to working fluid mass flow is materially reduced. Unless the compressor is substantially modified, it will be unable to develop the required pressure and may surge and/or stall. Thus, to practice the Martinka '706, Nakamura '023 or Rao '763 cycles the combustion-turbine machinery must be re-designed for each application. Because the compressor and expander must operate at matching pressure ratios, any redesign is a complicated and costly undertaking, and each different ratio of water vapor/air requires a new design.

Although it is theoretically possible to achieve greater flexibility with a combustion-turbine system in which the hot gas expander is not directly connected to the compressor, but rather drives an electric generator, and a compressor is in turn independently driven by an electric motor, such a system has not been used because the increase in capital cost over the equivalent direct-drive, closely-coupled system cannot be supported by the net potential improvement in efficiency.

Also, even if appropriate combustion turbine machinery were available, the Martinka, Nakamura, Rao and similar cycles are limited in the amount of external waste heat that can be utilized. This upper limit is determined by the maximum allowable concentration of water vapor in the combuster which will permit flammability of the fuel in the combuster. In essence, the water vapor in the air/water vapor mixture sent to the combuster must not be so high that the oxygen in the mixture is diluted to below the flammability limit for the fuel used.

OBJECTS OF THE PRESENT INVENTION

It is an object of the present invention to provide an improved process for producing power in which excess water vapor produced in certain presently known cycles is utilized to produce additional power.

It is an object of the present invention to provide an improved process that will allow the potential benefits of such cycles as the Martinka '706, Nakamura '023 and Rao '763 patents to be achieved with existing machinery.

It is a further object of the present invention to provide a system in which excess water vapor produced in certain presently known systems is effectively used to produce additional power.

It is a further object of the present invention to provide a process and system which employs an excess fluid turbine operating in parallel with a conventional, direct-drive combustion-turbine system.

It is a further object of the present invention to provide an improved system and process in which excess water vapor from a presently known cycle is supplied to an additional combuster and its combustion products are in turn expanded through an additional turbine and converted into mechanical power.

SUMMARY OF THE INVENTION

In accordance with the objects of the invention a system and process is provided in which excess fluids generated by a humidifier in certain presently known combustion-turbine cycles is used to extract additional energy from the cycle. Typically, this excess fluid is a mixture of water vapor and air produced in a multistage, counter-current flow humidifier and this excess fluid may be used as the working fluid in a conventional excess fluid turbine operating in parallel with the conventional, direct-drive combustion turbine system, and/or may be used as the source of air for an additional, appropriately sized, conventional combuster and expander operating in parallel with the conventional, direct-drive combustion-turbine system.

DETAILED DESCRIPTION OF PREFERRED EMBODIMENTS

With reference to FIGS. 1–8 specific embodiments of two presently known power production systems and of the present invention power production system and process will be described. Of central importance to the present invention, and as found in each of the below described embodiments of the present invention is the advantageous use of excess fluid developed by a multi-stage, counter-current humidifier used in a previously known power production cycle.

Although the typical fluid to be produced in such a cycle is mixture of air and water vapor, with the mixture having a wide range of moisture contents, the water vapor and air mixture of the preferred embodiments may sometimes be referred to simply as the excess fluid. It is also to be understood that, although air and water are the two most commonly used fluids in such systems, and thus the air and water vapor mixture will be the typical excess fluid, the present invention is not limited to such fluids but may, in certain applications, use other fluids as will be appreciated and known by those skilled in this field.

Figure 1:
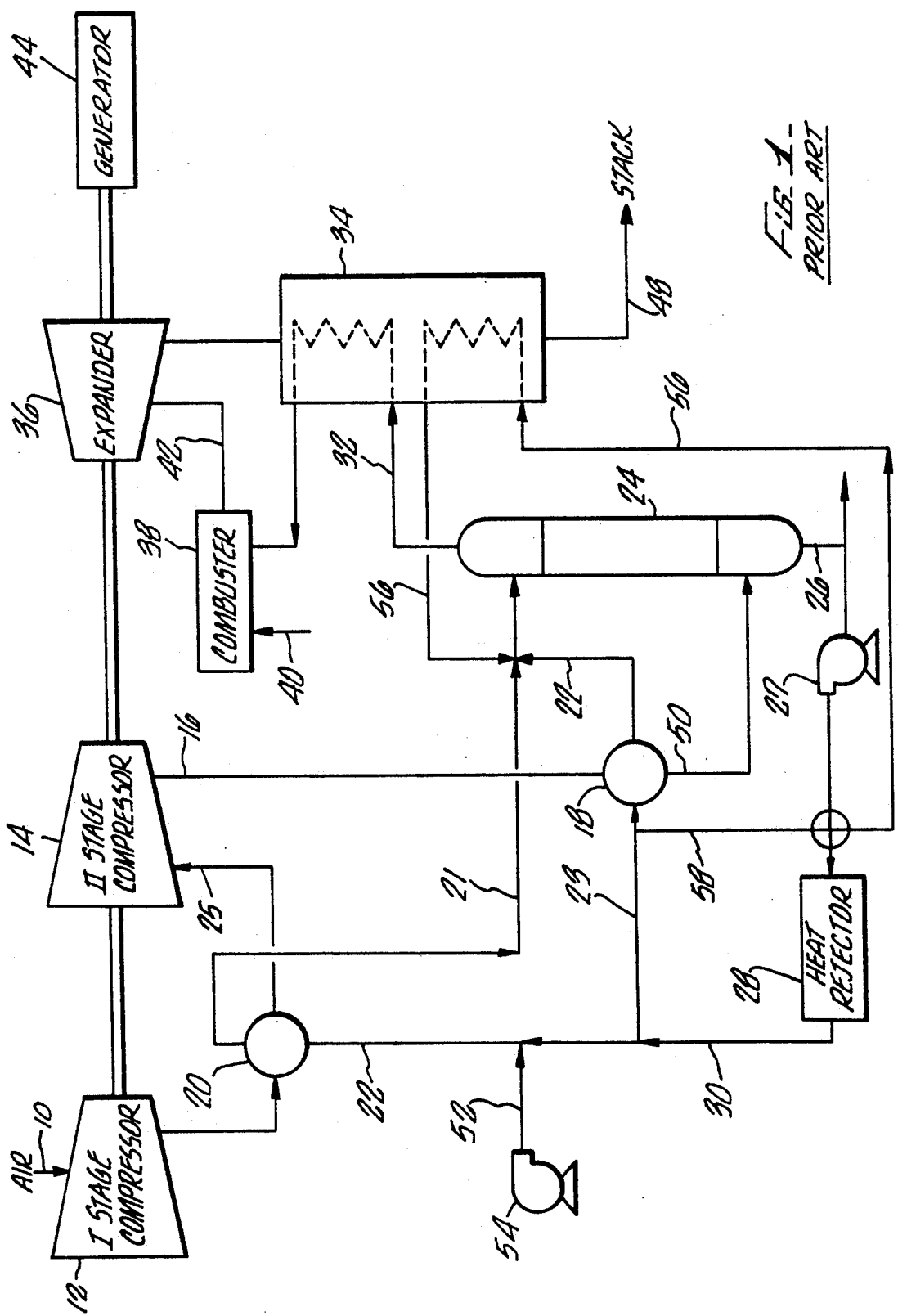
FIG. 1 is a schematic drawing illustrating a presently known combustion-turbine cycle which employs a countercurrent, multistage humidifier to generate water vapor used as thermal diluent in the combuster.

Referring to FIG. 1, a combustion-turbine cycle as described in the Rao '763 patent provides a meaningful context within which to describe and understand the present invention.

Air through line 10 is introduced into the first stage 12 of the conventional two stage air compressor. The compressed air exiting the first stage 12 is supplied through line 17 at a temperature of approximately 300° F. to 400° F. and passes through conventional heat exchanger 20, also known as an intercooler, where it undergoes heat exchange with water passing through line 22. The temperature of the compressed air may be reduced by approximately 40° F. to about 250° F., but typically is reduced to a temperature of about 70° F. to 140° F. The compressed air then exits the intercooler 20 and is passed through line 25 to the second stage 14 of the air compressor.

The compressed air exiting the second stage 14 of the air compressor is passed through line 16 at a temperature of approximately 300° F. to about 500° F. and then through conventional heat exchanger 18, which is also commonly referred to as an aftercooler, where it exchanges heat with water incoming through line 20 or line 58. The temperature of the compressed air may be reduced in the aftercooler 18 by approximately 40° F. to about 250° F., but typically is reduced to a temperature of about 115° F. to about 200° F. The air is then fed through line 50 to the saturator 24.

After heat exchange in intercooler 20, the water in line 21 is introduced into the top section of a conventional saturator, or humidifier 24 and at a temperature of about 300° F. to about 400° F. Within the humidifier 24 the air and water are contacted countercurrently in multistages to evaporate water and thus to improve the thermodynamic efficiency of the cycle. The operating pressure of the saturator 24 is about 200 psi to about 600 psi, and the water temperature in the saturator is approximately 300° F. to about 400° F. The water remaining after evaporation is removed from the bottom of the saturator 24 through line 26 and is pumped by pump 27 through heat exchanger 28, and may be directed through lines 58 and/or 56. Additional water may be fed through lines 22 and/or 56 to the humidifier 24.

Because the conventional heat exchanger 28 extracts heat from the circulating water and rejects it from the cycle or system, it is also commonly known as a heat rejector. Although the heat rejector 28 is shown as extracting heat from the circulating water in the system and rejecting that heat from the system, heat rejection may also be accomplished directly by extraction of heat from the compressed air and rejecting it from the system by use of conventional heat exchange or refrigeration methods and systems. After heat exchange in exchanger 28, the cooled water is fed through line 30 to line 22 and/or line 23 where it is used to extract heat in the intercooler 20 and/or aftercooler 18.

The humidified air, that is, the water vapor/air mixture, exits humidifier 24 through line 32 as essentially saturated air at approximately 250° F. to about 350° F. and is passed through conventional heat recovery unit 34 in heat exchange relationship with the exhaust from conventional expander 36 where it is preheated prior to introduction into combuster 38.

The fuel for combustion is introduced through line 40 into the combuster 38 and the hot, combusted gaseous product exits through line 42 and is then fed to and drives expander 36. The expander 36 drives the air compressor and generator 44 for the production of electrical power.

Within heat recovery unit 34 the hot exhaust from the expander 36 is passed in heat exchange relationship with water in line 56 to heat the water to the appropriate temperature for humidification within the saturator 24 as illustrated. Also, as shown, in the upper, or hotter region of recovery unit 34 the water vapor/air mixture is heated and then supplied to the combuster 38. Also, make up water may be added through line 52 by pump 54 as is necessary to maintain a proper water inventory in the circulating water system. Exhaust from recovery unit 34 is rejected from the system through line 48 and the stack.

While the two-stage compressor, turbine and generator are described and illustrated as coupled on a single shaft, it will be appreciated that other arrangements may be used, as is well known and understood in this art.

Figure 2:
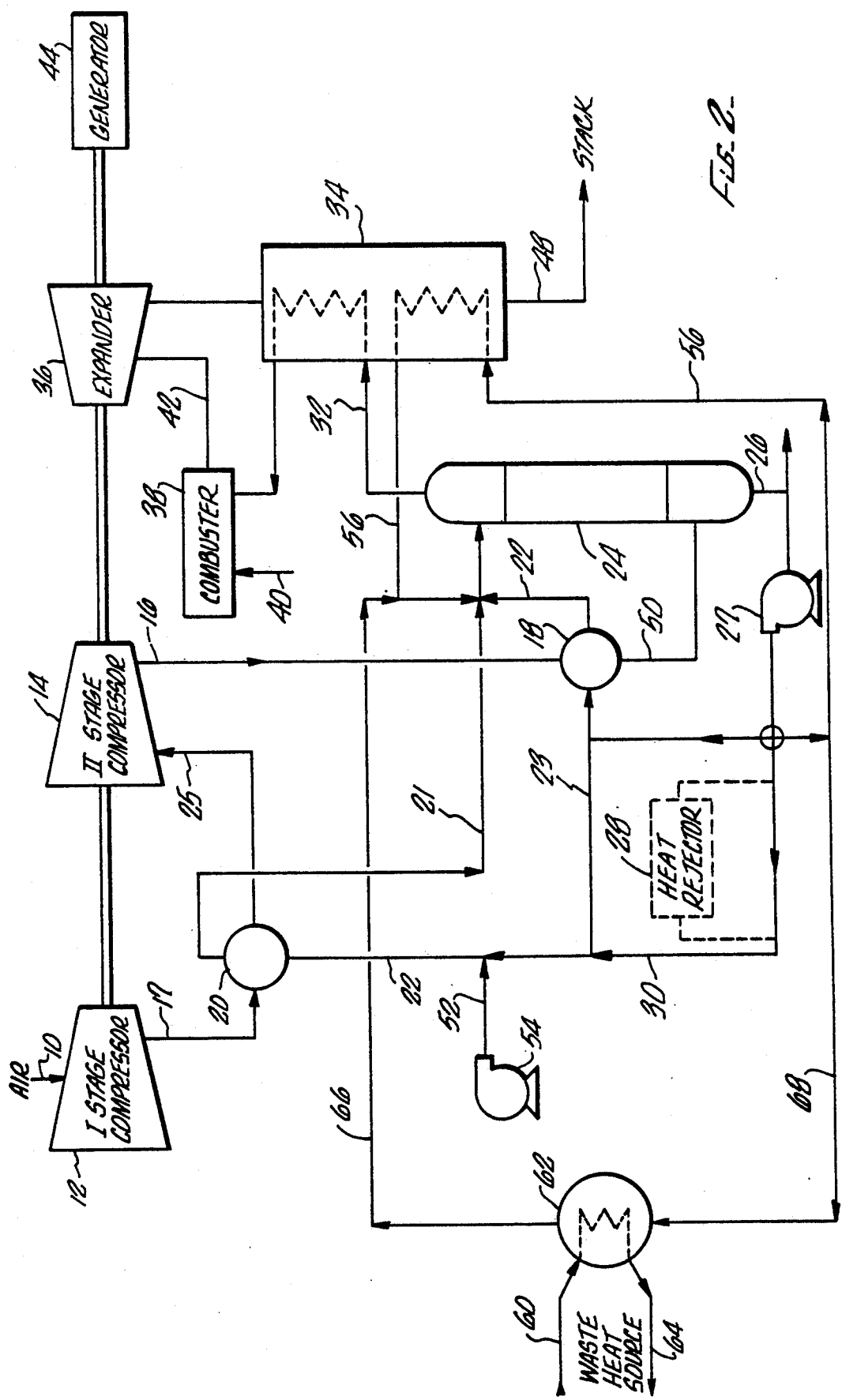
FIG. 2 is a schematic diagram of a presently known combustion-turbine cycle of FIG. 1 further including use of a waste heat source.

Referring to FIG. 2, a combustion-turbine cycle as described in the Rao '263 patent and as shown in FIG. 1, but having an additional waste heat source is shown. The same components and reference numerals are used for like components in FIG. 2 as were previously illustrated and described with respect to FIG. 1. It is noted, however, that an optional waste heat source may be used to supply additional heat, by means of e.g., a hot water medium inlet line 60, through conventional heat exchanger 62 and return line 64 so that the circulating water within the turbine cycle will have increased heat supplied through line 66. Circulating water is returned to heat exchanger 62 through line 68.

Figure 3:
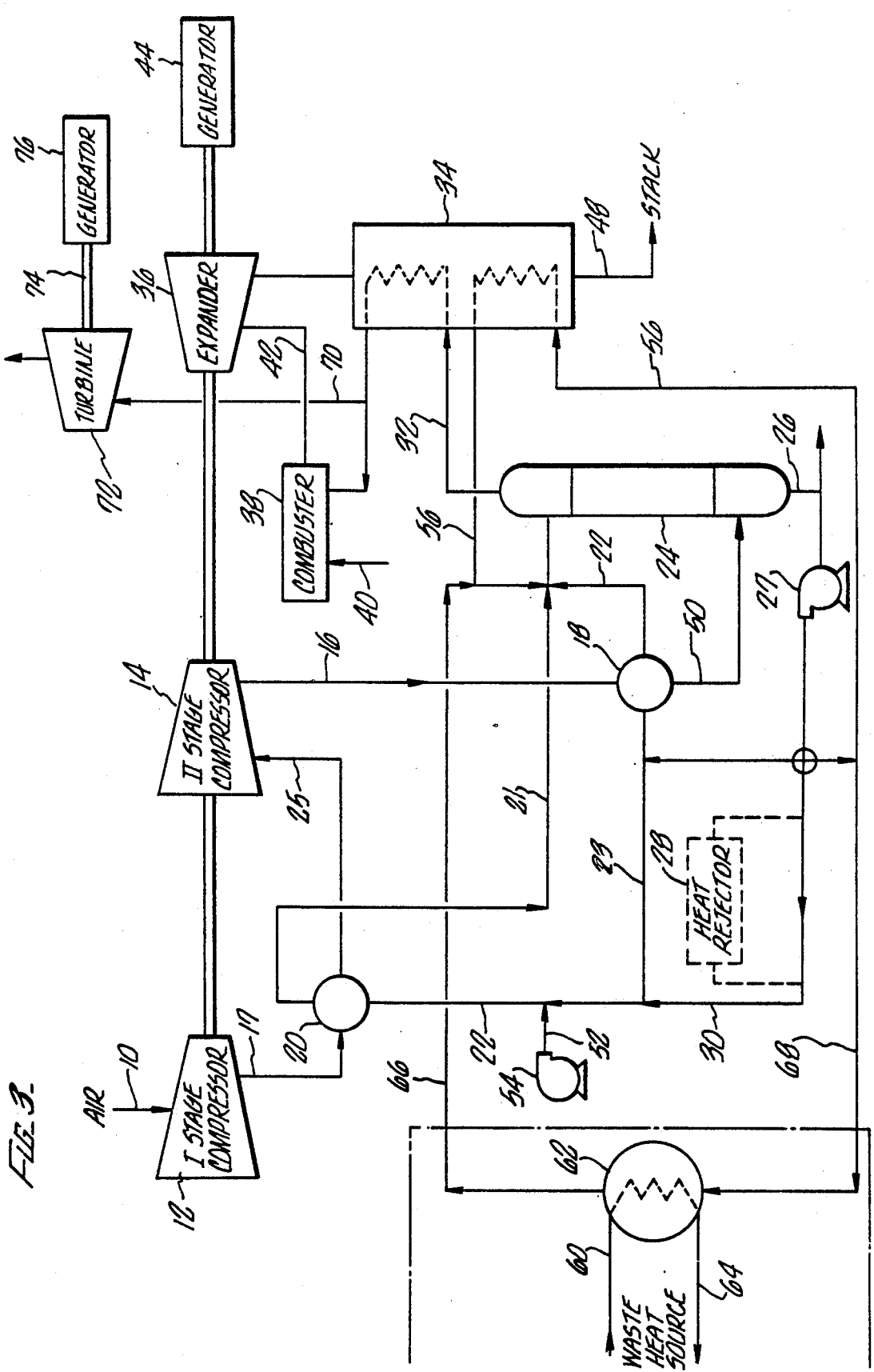
FIG. 3 is a schematic diagram of a preferred embodiment of the present invention in which excess moist air is fed to an excess fluid turbine for power production.

Referring to FIG. 3 one preferred embodiment of the present invention is illustrated as a modification to the system and process of the combustion-turbine cycle of FIG. 1, or one in which an optional waste heat source, of FIG. 2, is employed. Although the present invention system and process may be used, of course, in conjunction with an entirely new construction combustion-turbine plant, it can also be used to improve the efficiency of existing power plants. Referring to FIG. 3 it may be seen that a conventional power production system is shown in part, using the symbols and reference numerals of FIGS. 1 and 2, with like reference numerals to indicate like components. As described above, the conventional system using a counter-current, multi-stage humidifier 24 has the capacity to produce excess water vapor—air mixture, or "excess-fluid", beyond that which can be effectively used in the combuster 38. As shown in FIG. 3 the water vapor/air mixture in line 32, after exiting the heat recovery unit 34, is split, with a portion of the water vapor/air mixture being fed to combuster 38, and with another portion, i.e., the "excess-fluid" portion being supplied to turbine 72 through line 70. The turbine 72 is also referred to as the "excess-fluid" turbine 72. The excess fluid turbine 72 is connected to a load, such as conventional generator 76 through coupling 74. Use of heat rejector 28 is optional with the present invention.

The separate turbine 72 is an independent, conventional turbine which performs work such as by driving an electric power generator. When the system and process of FIG. 3 is used without the waste heat source option, the amount of heat available is not sufficient to raise the water vapor concentration high enough to involve flammability considerations. Also, in some applications where waste heat sources are employed, the amount of waste heat available might not be sufficient to raise the water vapor concentration high enough to involve flammability considerations. Also, in accordance with well-known principles of thermodynamics, the rate of moist air flowing to the combuster 38 is chosen to be the optimum rate for operation of the conventional combustion turbine machinery of the plant while the "excess" moist air flows to the separate turbine 72.

Figure 4:
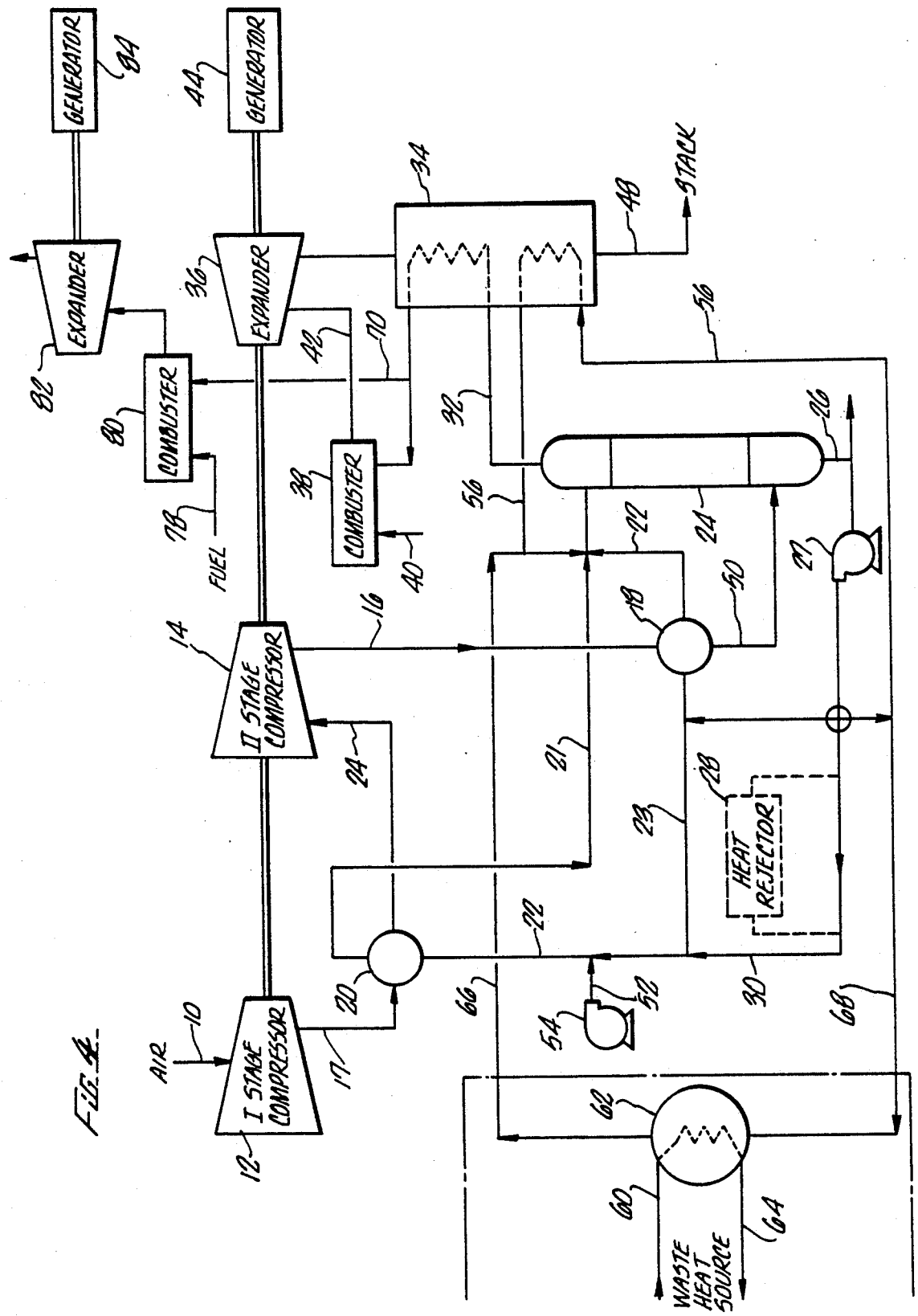
FIG. 4 is a schematic diagram of a preferred embodiment of the present combustion-turbine cycle in which excess moist air is supplied to an excess fluid combuster and thereafter used to produce additional power.

Referring to FIG. 4 the same basic power production system with the waste heat option is illustrated using like reference numerals referring to like components as shown in FIGS. 1-2. In the FIG. 4 embodiment, however, the excess fluid passing through line 70 is fed to a separate, conventional combuster 80 rather than directly fed to an "excess-fluid" turbine. The separate, conventional combuster 80 is supplied with fuel through line 78 and its hot combustion products are sent to a conventional expander 82. The expander 82 is connected to a typical load such as a generator 84. Also, as indicated, the heat rejector 28 is optional.

Comparing the systems shown in FIGS. 3 and 4, if both use the same principal combustion turbine machinery, the system of FIG. 4 will produce more power than that of FIG. 3, but at a lower efficiency, albeit an efficiency still higher than achievable with conventional systems.

In the FIG. 4 embodiment the amount of heat available to generate the moist air in humidifier 24 would be insufficient to reach the flammability limitations of the combuster 38.

Figure 5:
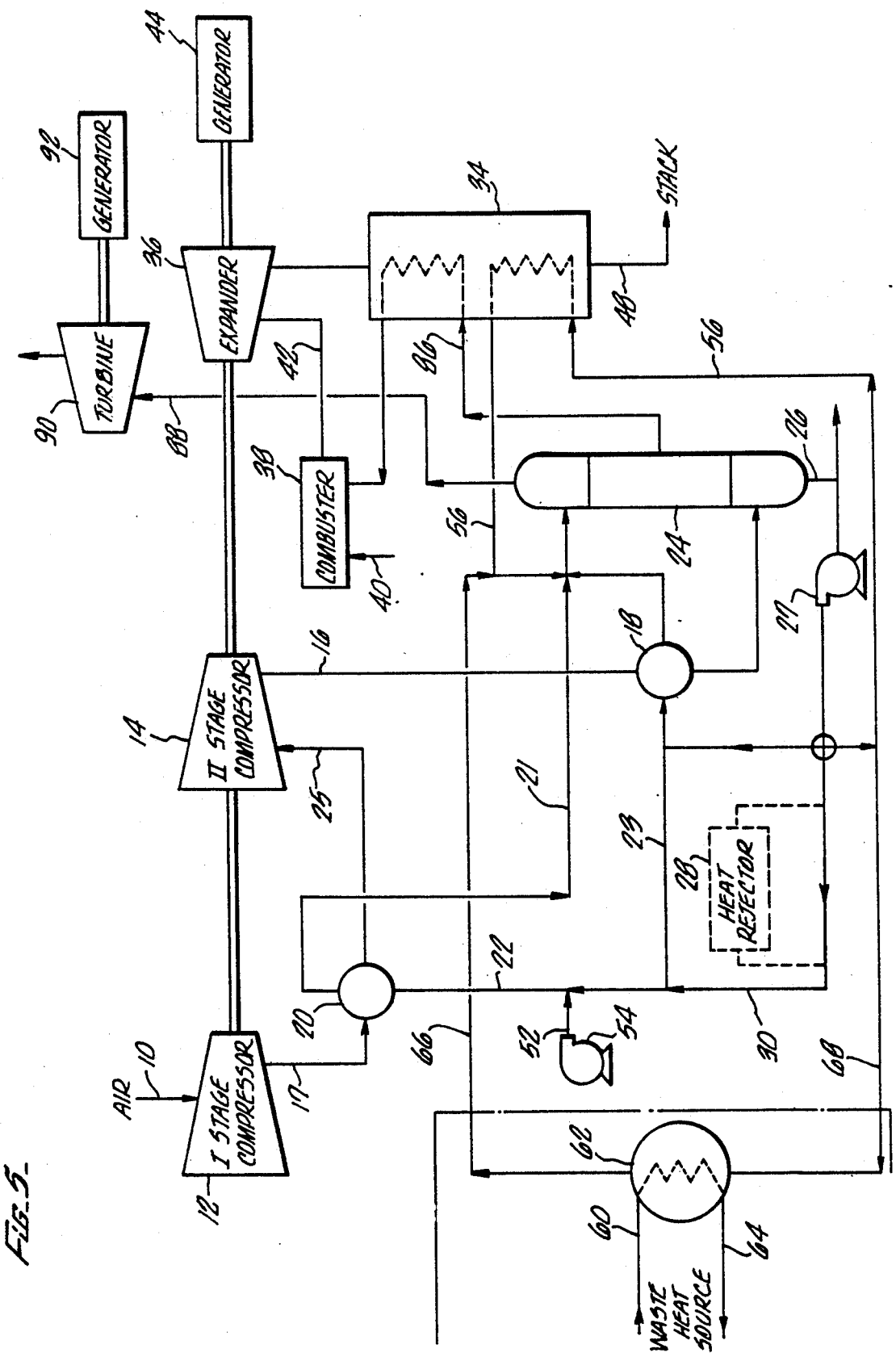
FIG. 5 is a schematic diagram of a preferred embodiment of the combustion-turbine cycle of the present invention in which two streams of excess moist air, each having a different moisture content, are separately fed to the combuster and to an excess fluid expander.

Referring to FIG. 5 another preferred version of the system and process of the present invention is illustrated for those circumstances when the optional waste heat source is capable of providing sufficient external waste heat so that the flammability considerations mentioned above may be exceeded. In FIG. 5 like reference numerals refer to like components of the previously described power production systems of FIGS. 1-4. Referring to humidifier 24 of FIG. 5 it may be seen that two, separate streams of moist air are supplied by the humidifier 24. The relatively lower moisture content stream of moist air exits humidifier 24 part-way up through line 86, is passed through heat recovery unit 34 and is then supplied to the combuster 38 for use as combustion air and as a thermal diluent. Referring again to humidifier 24, it may be seen that a second, relatively higher moisture content moist air stream, also known as the "wet" stream, exits from the top of the humidifier 24 through line 88 and is supplied directly to conventional turbine 90. This relatively more moist, excess fluid stream passing through line 88 is too moist to be useful as combustion air in a combuster, but does contain sufficient energy to be useful in a conventional turbine or expander such as illustrated by reference numeral 90. As one skilled in the art will know, in some cases, a conventional steam turbine will be appropriate for this service; in other cases a typical expander may be a better choice. The turbine 90 is connected to a load such as generator 92. Also, heat rejector 28 is optional.

Figure 6:
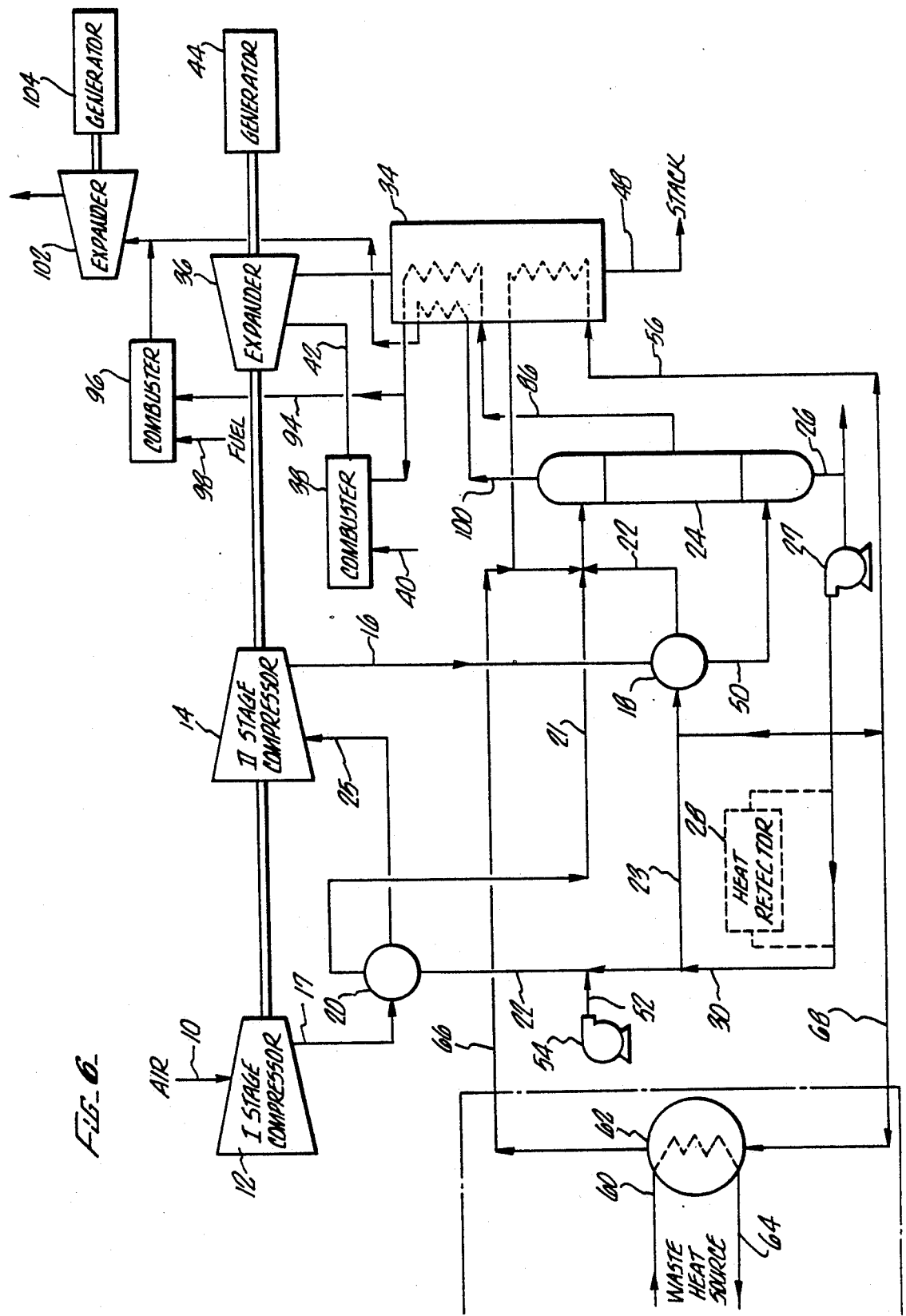
FIG. 6 is a schematic diagram of a preferred embodiment of the combustion-turbine cycle of the present invention in which two streams of moist air, each having a different moisture content, are fed to a combuster, to an excess fluid combuster and to an excess fluid expander.

Referring to FIG. 6 yet another preferred embodiment of the present invention is illustrated with like reference numerals referring to like components of the previously described systems as shown in FIGS. 1-5. The FIG. 6 embodiment is for use in circumstances where the waste heat source option is used and there is sufficient waste heat available to exceed the flammability limitations of the combuster 38. It would be chosen over the FIG. 5 embodiment when more power is desired and a somewhat lower efficiency is acceptable. Referring to humidifier 24 it may be seen that a lower, or relatively dry moist air stream exits the humidifier through line 86, is passed through heat recovery unit 34, and is then fed to combuster 38 and, through line 94 to separate combuster 96 which receives its fuel supply through line 98. Again referring to the humidifier 24 it may be seen that the upper, relatively more moist, or "wet" moist air stream exits the humidifier through line 100, is passed through heat recovery unit 34 and is then fed to conventional expander 102 together with the hot combustion gases from combuster 96. The expander 102 is connected to a typical load such as generator 104. Heat rejector 28 is optional.

In a system and process of the type illustrated in FIG. 6 the compressed air exiting first stage compressor 10 through line 18 is about 350° F. to 450° F. and the compressed air leaving the second stage compressor 14 through line 16 is at a temperature of about 450° F. -575° F. Referring to the humidifier 24, the relatively dry moist air stream exits the humidifier in line 86 at a temperature of about 250° F. to 350° F. This stream is then heated in heat recovery unit 34 and is at a temperature of about 800° F. to 900° F. as it enters the combuster 38. The relatively wet moist air stream exits the humidifier through line 100 at a temperature of about 350° F.-400° F. and is heated in the heat recovery unit 34. This stream then is fed to the expander 102 at a temperature of about 800° F. to 900° F. The exhaust from turbine 36 is at a temperature of approximately 900° F. to 1000° F.

Figure 7:
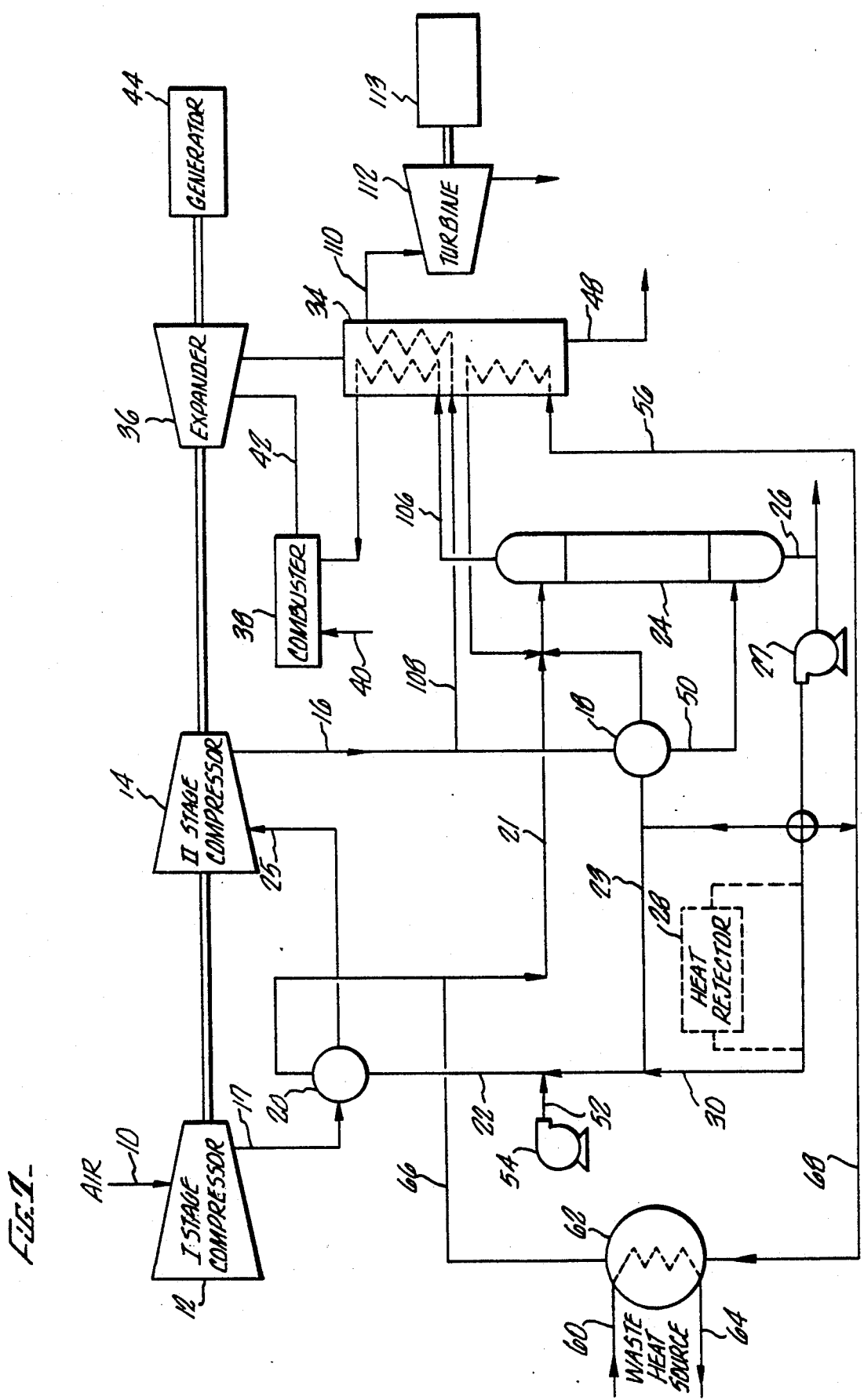
FIG. 7 is a schematic diagram illustrating a preferred embodiment of the combustion-turbine cycle of the present invention in which excess compressed air is heated by expander exhaust and is used in an excess fluid turbine to produce additional power, with the remaining compressed air being fed to a multi-stage, counter-current flow humidifier to produce moist air for use in a conventional combustion turbine system.

Referring to FIG. 7 another embodiment of the present invention is illustrated, with like reference numerals referring to like components as illustrated in FIGS. 1-6. The FIG. 7 embodiment is useful in circumstances where waste heat is available, but the amount of waste heat is insufficient to raise the water vapor concentration high enough to involve flammability considerations in the combuster 38. Referring to humidifier 24 of FIG. 7 it may be seen that circulating water in line 66 from the optional waste heat source is combined with the circulating water in line 21 to illustrate a different arrangement than shown in the other figures for increasing the heat content of the water circulating into the saturator 24. Heat rejector 28 is optional.

Additionally, hot, compressed air from line 16 is passed in heat exchange relationship to the exhaust from turbine 36 in heat recovery unit 34 and the further heated air is thereafter sent through line 110 to conventional expander 112 which is connected to a load 113. As may be appreciated the optimum balancing of the mass flow rates, temperatures, and pressures of fluids passing through the various lines and sent to the combuster 38, the expander 112 and the humidifier 24 may be determined through use of well-known thermodynamic principles.

In a system and process as illustrated in FIG. 7 the hot air exiting the first stage compressor 10 in line 18 is at a temperature of approximately 350° F. to 400° F. and the hot air exiting the second stage compressor 14 through line 16 is at a temperature of about 450° F.-575° F. The humidified air exiting humidifier 24 in line 106 is at a temperature of about 300° F.-400° F. as it enters heat recovery unit 34. This stream, after having been heated in unit 34 is at a temperature of about 800° F. to 900° F. as it enters combuster 38. The hot, compressed air in line 108 is heated in unit 34 to a temperature of about 800° F. to 900° F. as it exits the recovery unit 34 and enters the expander 112. The temperature of the exhaust leaving turbine 36 is about 900° F. to 1000° F.

Figure 8:
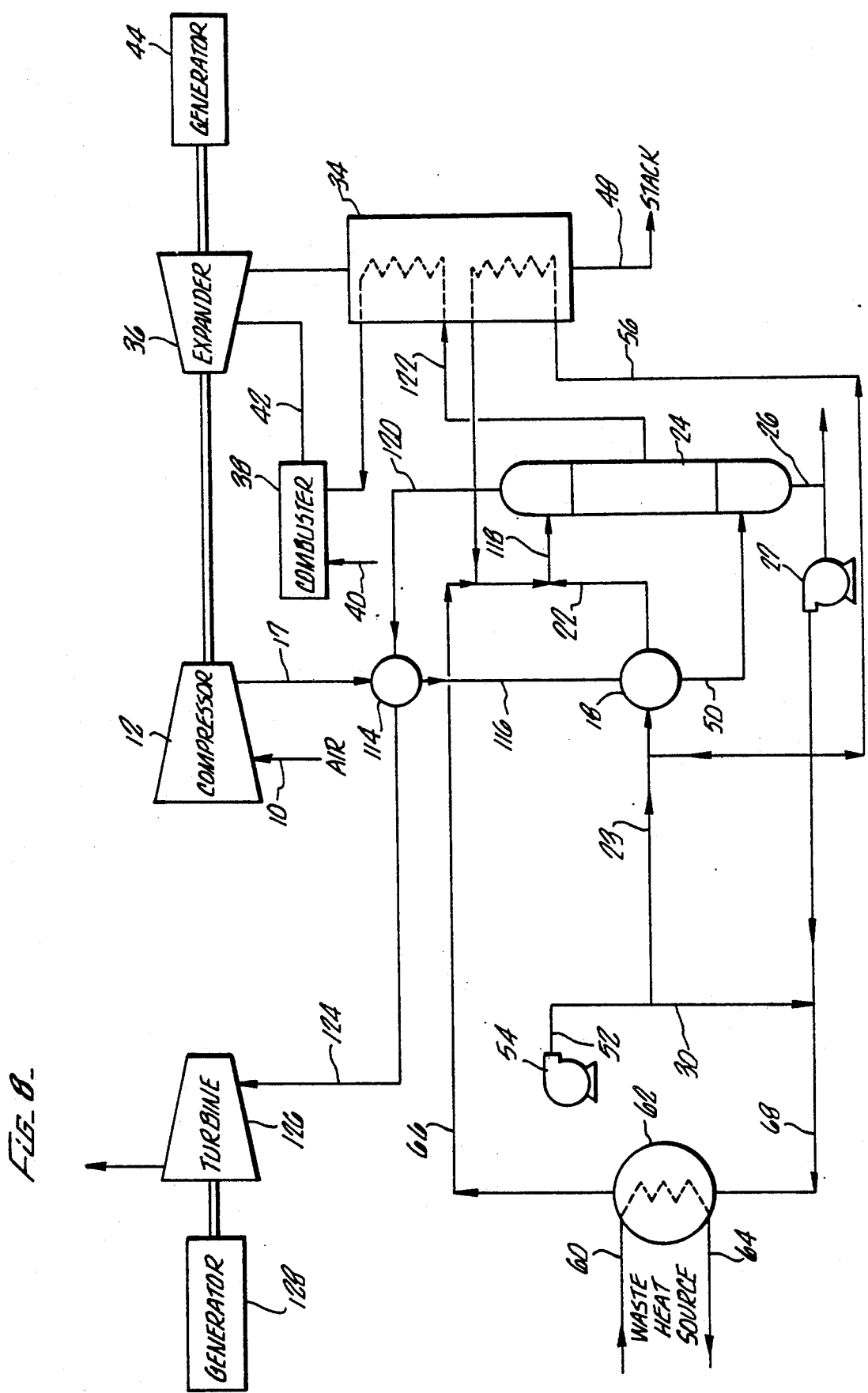
FIG. 8 is a schematic diagram of a single stage (i.e., without intercooling) compression, combustion-turbine cycle of the present invention in which excess fluid from the humidifier is supplied to an excess fluid turbine.

Referring to FIG. 8 another embodiment of the present invention is illustrated using like reference numerals to indicate like components of the power production system as shown in FIGS. 1-7. The FIG. 8 embodiment illustrates the application of the new process and system when the combustion turbine machinery uses a single stage air compressor (i.e., without intercooling) and the waste heat option is used and the waste heat available is sufficient to moisturize the air beyond the flammability limitations of combuster 38. Referring to humidifier 24 it may be seen that a lower, relatively less moist stream exits the humidifier through line 122, is passed in heat exchange relationship with the turbine 36 exhaust through heat recovery 34 and is then supplied to combuster 38 as thermal diluent. The second, higher or "wet" stream exits the top of humidifier 24 through line 120 and is passed in heat exchange relationship with the hot, compressed air through line 18 in conventional heat exchanger 114. The higher temperature, wet fluid from heat exchanger 114 is then passed through line 124 to conventional turbine 126. The turbine 126 is coupled to a load, such as a generator 128. Heat rejector 28 is optional.

In a system and process as illustrated in FIG. 8 the compressed air leaving the compressor 12 in line 18 is at a temperature of about 600° F. to 750° F. The relatively dry humidified air stream leaving humidifier 24 in line 122 exits the humidifier at a temperature of about 250° F. to about 350° F. After heating in heat recovery unit 34 this stream enters the combuster 38 at a temperature of about 600° F. to 950° F. The relatively wet humidified air stream exiting the humidifier 24 through line 120 exits at a temperature of about 350° F. to 400° F. After heat exchange in conventional heat exchanger 114 the heated, wet humidified air stream in line 124 is at a temperature of about 350° F. to 700° F. as it enters the expander 126. The exhaust from turbine 36 is at a temperature of about 850° F. to 1100° F.

As may be appreciated with respect to all of the embodiments of the present invention, the specification and capacity of the expander 36 will dictate other specifications such as the size and maximum operating temperature conditions in combuster 38, and the flow rate and moisture content of the moist air exiting humidifier 24 to be useful in the combuster 38. With these specifications determined, and knowing the amount of waste heat available from optional waste heat sources, as described above, it may then be determined the flow rate and relative moisture content of the relatively wet, excess fluids available from humidifier 24 to be used directly in an excess fluid turbine, or indirectly in an excess fluid turbine through use of an independent combuster/turbine/generator arrangement as described above.

While seven of the eight embodiments shown in the drawings use two-stage air compressors, the systems of the present invention, as illustrated in FIGS. 3-8 are also applicable to combustion turbine systems with single stage air compressors. Also, although the systems shown in FIGS. 1 and 2 require use of a heat rejector 28, in the present invention, the heat rejector 28 is optional.

While various preferred embodiments and applications of the present system and process have been shown and described, it will be apparent to those skilled in the art that numerous modifications to the system and process are possible without departure from its inventive concepts, as for example with multiple turbines in series or with a reheat gas turbine. The above-described preferred embodiments are therefore provided for illustrative purposes only and not for purposes of limitation, the invention being limited only by the claims appended hereto.

I claim:

1. An improved system for producing mechanical power from a combustion turbine cycle which includes a combuster, a first turbine and a multi-stage countercurrent flow humidifier to supply a water vapor/air mixture as combustion air and thermal diluent to the combuster, the improvement comprising:

a second turbine and means for utilizing the excess water vapor/air mixture to produce additional power in the second turbine, wherein said means for utilizing the excess water vapor/air mixture includes a conduit to directly supply the excess mixture to said second turbine.

2. An improved system for producing mechanical power from a combustion-turbine cycle which includes an external source of heat, a combuster, a turbine and a multi-stage countercurrent flow humidifier capable of supplying humidified air to the cycle, the improvement comprising:

the humidifier adapted to produce a first steam of relatively less moist humidified air and a second stream of relatively more moist humidified air;

a second turbine; and means for utilizing at least one of the first and second streams of moist humidified air to produce additional power in the second turbine.

3. A process for producing mechanical power comprising:

humidifying compressed air to produce a gaseous medium;

dividing said gaseous medium into a first portion and a second portion;

combustion a combustible fuel in the presence of said first portion of said gaseous medium to drive a first turbine and produce mechanical power; and using said second portion of said gaseous medium to drive a second turbine and produce additional mechanical power, wherein said second portion of said gaseous medium is supplied directly to said second turbine after humidification.

4. A process for producing mechanical power comprising:

humidifying compressed air in a humidifier to produce a first gaseous medium containing a relatively low percentage of water vapor and a second gaseous medium containing a relatively high percentage of water vapor;

combusting a combustible fuel in a combustion chamber in the presence of said first gaseous medium to produce a working fluid;

expanding said working fluid in an expander or a turbine to produce mechanical power; and using said second gaseous medium to produce additional mechanical power in a second turbine.

5. The process of claim 4 wherein said second gaseous medium is supplied directly from said humidifier to said second turbine.

6. The process of claim 4 wherein said second gaseous medium and additional fuel are supplied to a second combustion chamber, combusted in said second combustion chamber to provide a second working fluid, and said second working fluid is fed to said second turbine.

7. The process of claim 4 wherein said second gaseous medium is heated prior to being used to produce said additional mechanical power.

* * * * *

UNITED STATES PATENT AND TRADEMARK OFFICE
CERTIFICATE OF CORRECTION

PATENT NO. : 5,181,376
DATED     : January 26, 1993
INVENTOR(S) : ASHOK D. RAO

It is certified that error appears in the above-indentified patent and that said Letters Patent is hereby corrected as shown below:

In the drawings, on sheet 2 of 8, under Fig. 2, insert the words

-- <u>PRIOR ART</u> --

Signed and Sealed this

Fourteenth Day of December, 1993

Attest:

BRUCE LEHMAN

Attesting Officer

Commissioner of Patents and Trademarks